United States Patent [19]

Ludicke

[11] Patent Number: 4,777,728
[45] Date of Patent: Oct. 18, 1988

[54] MOUNTING TO ESTABLISH A BASIC REFERENCE FOR MEASURING MACHINES AND MACHINE TOOLS

[75] Inventor: Frank Ludicke, Braunschweig, Fed. Rep. of Germany

[73] Assignee: Carl-Zeiss-Stiftung, Heidenheim/Brenz, Oberkochen, Fed. Rep. of Germany

[21] Appl. No.: 87,406

[22] Filed: Aug. 20, 1987

[30] Foreign Application Priority Data

Oct. 18, 1986 [DE] Fed. Rep. of Germany ....... 3635511

[51] Int. Cl.⁴ ................................................. G01B 3/04
[52] U.S. Cl. ..................................... 33/125 T; 33/1 D
[58] Field of Search ............. 33/125 R, 125 A, 125 C, 33/125 T, 125 M, 489, 486, 449, 1 D; 364/561

[56] References Cited

U.S. PATENT DOCUMENTS

| 3,225,445 | 12/1965 | Duggan | 33/449 |
| 3,916,528 | 11/1975 | Eisenkopf | 33/125 C |
| 4,631,830 | 12/1986 | Rieder et al. | 33/125 R |

FOREIGN PATENT DOCUMENTS

| 2727769 | 6/1977 | Fed. Rep. of Germany | 33/125 C |
| 3444953 | 7/1985 | Fed. Rep. of Germany | |
| 425247 | 3/1967 | Switzerland | |

Primary Examiner—William D. Martin, Jr.
Attorney, Agent, or Firm—Hopgood, Calimafde, Kalil, Blaustein & Judlowe

[57] ABSTRACT

For the mounting of measuring scales or straight-edges, they are clamped on balls (2, 6) rollably retained within small regions, which form a lengthwise guide and are fixed relative to their mounting (3) at a single point (5).

17 Claims, 5 Drawing Sheets

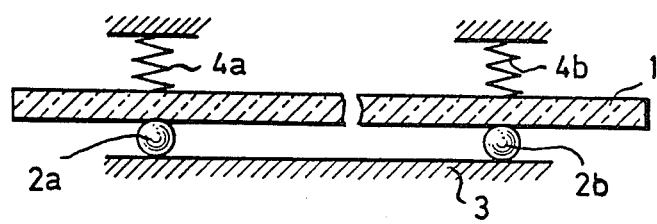
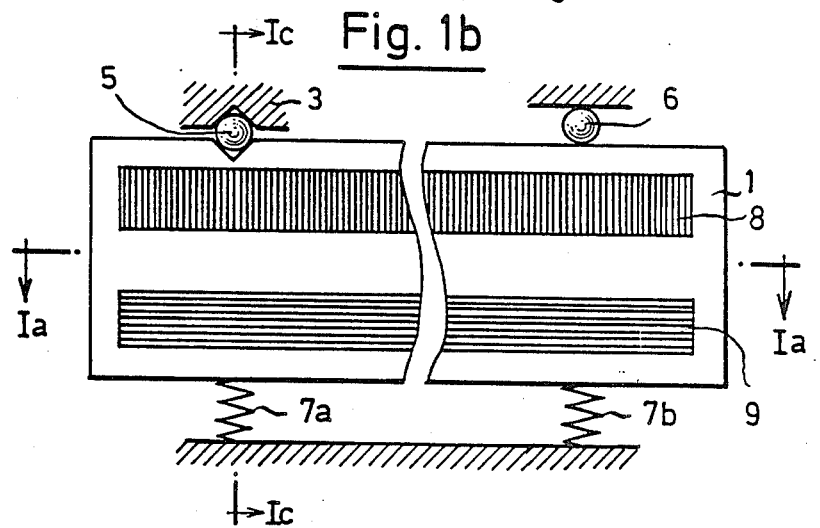
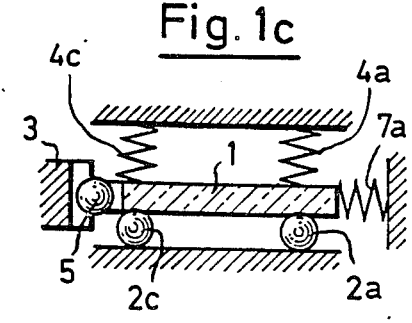
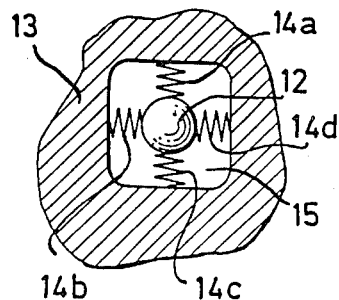

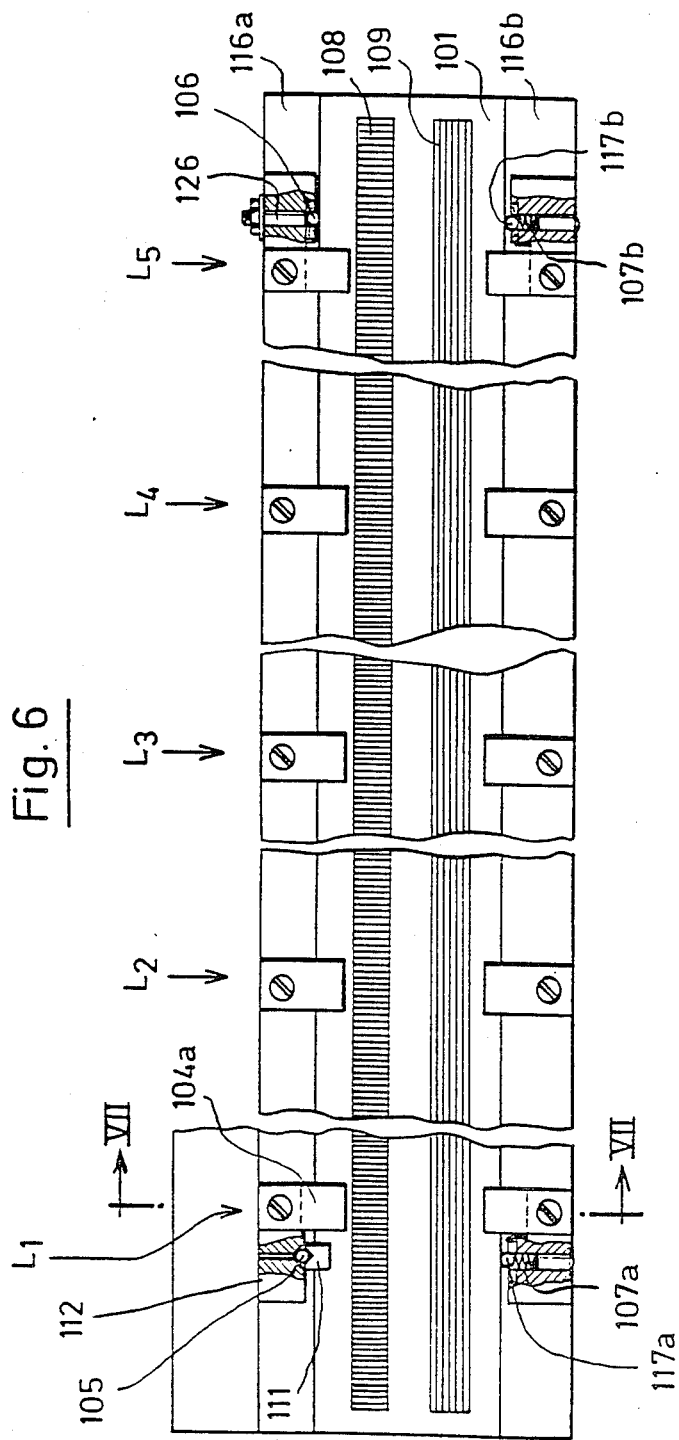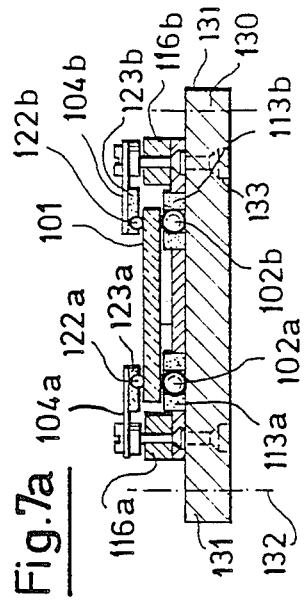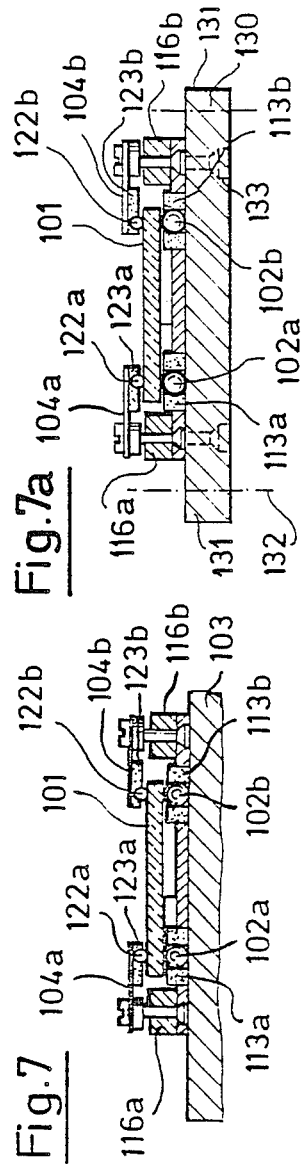

MOUNTING TO ESTABLISH A BASIC REFERENCE FOR MEASURING MACHINES AND MACHINE TOOLS

BACKGROUND OF THE INVENTION

Length-measuring devices used, inter alia, in coordinate-measuring machines or machine tools conventionally employ a glass scale having a longitudinal succession of graduations that are scanned by a photoelectric sensor system. And recently, it has has become known that a second scale, alongside the measurement graduations, and in the form of several parallel lines extending in the lengthwise direction of the scale, can be an important component of a device for determining the degree of linearity of a given measurement of the graduations. In this connection, reference is made to U.S. Pat. No. 4,587,622 as well as to Federal Republic of Germany Patent Application 3,542,514.8.

The parallel lines of the scale of such a linearity-determining device serve to detect guidance errors of the measuring machine or machine tool, and therefore stringent requirements are imposed on the means of supporting the scale whereby to assure shape stability in the scale. And the type and manner of attaching the scale to the machine presents special problems through deformations of the scale due to transverse forces which result from any difference in thermal expansion of the scale and its holder or mounting.

It is already known that thermal stresses can be avoided by mounting a scale to its support by means of a layer of elastic adhesive, as is described in Federal Republic of Germany Patent Application OS 2,505,587. A further proposal has been to use, instead of the continuous elastic layer of adhesive, several pieces of rubber interrupted by intervening spaces; the scale is clamped on these pieces of rubber which are intended to compensate for the thermal stresses between the scale and the holder. Even with this type of attachment, which is described, for example, in Federal Republic of Germany OS 3,312,534 and in U.S. Pat. No. 4,569,137, residual forces still remain to an extent which intolerably deforms the scale. The principal disadvantage is that, even after temperature compensation, the scale no longer returns reproducibly to its initial position but instead, because of frictional forces, assumes an undefined new position. As a consequence of long-duration scale-constraining forces in the mounting, deformations have been observed that can be interpreted as flow of the glass of which the scale is made. All this may lead to errors in measurement, both upon position measurement in the lengthwise direction of the scale and, to a much greater extent, also in translation measurement values obtained from the linearity measurement device.

BRIEF STATEMENT OF THE INVENTION

It is the object of the present invention to provide a scale mount for measuring machines and machine tools, such as, for example, a mount for the graduated scale of a length-measuring device, whereby the scale is held in its mount in as unconstrained a manner as possible and whereby thermally produced stresses between the scale and its holder are avoided.

In accordance with the invention, this object is achieved by a resiliently preloaded clamping of the measurement scale (or straight edge, or contouring template) on bearing balls which are rollably retained within small areas.

By this type of clamping, the measuring device and its holder are mechanically decoupled from each other to the greatest extent possible. The measuring or template device can move in a force-free manner relative to its holder under conditions of changing temperature, and there are no permanent deformations as a result of thermal action.

Measuring and shaping devices such as scales or straight-edges are generally of relatively thin parallelepiped shape. For secure attachment, regardless of installed location, it is therefore expedient to have not only their broad side but also their narrow side derive referencing support via rollably retained balls.

Clamping action is advantageously accomplished by means of preloading springs, for each of which the direction of force application is perpendicular to the locus of rolling motion of the involved ball center and passes through the bearing balls, so that no transverse forces are produced by reason of clamp action. It is further advantageous if the spring force is applied to the scale indirectly through similar rollably retained balls. Upon changes in length, the scale can then roll freely on the aligned balls between which it is engaged, provided care has been taken that the surfaces between which the balls are clamped are sufficiently parallel.

Because length changes between scale and holder are relatively small in practice, it is sufficient to assure incremental rollability of the balls by holding them in softly yielding pliant retainers, such as, for example, rubber straps, felt rings or ball cages, each of which is lined with a resiliently pliant wall. Such retainers assure ball positioning at predetermined bearing points and considerably facilitate the mounting of the scale.

The bearing points themselves and their number may suitably be selected as functions of the resiliency, i.e., substantially as a function of the length and thickness of the scale. For short scales, even installed in a horizontal position, support at the two Bessel points is sufficient. For greater lengths, on the other hand, in particular when the scale is of only a small thickness, support at more than two points is necessary in order to prevent sagging deformation of the scale, due to its own weight. A sag between the bearing points causes fluctuation in the distance between the scale and the sensor system that scans it, so that measuring errors are produced.

If the scale is suitably flat, it can be placed directly on the balls of the mounting, in which case, steel balls or balls of other hard material such as sapphire or ruby can be employed. At contact with the holder, the balls can roll on hardened, polished steel inserts or, for example, directly on the granite base plate of a measuring machine.

DETAILED DESCRIPTION

Several illustrative embodiments of the invention will be described in detail in conjunction with the accompanying drawings, in which:

FIGS. 1a to 1c are fragmentary elementary diagrams showing a ball-mounted measurement scale of the invention together with its mounting, in three different cross sections, namely, longitudinal section in one plane of mounting support, longitudinal section in a plane orthogonal to the plane of FIG. 1a, the plane of FIG. 1a being taken at 1a—1a of FIG. 1b, and the transverse section in the plane 1c—1c of FIG. 1b, respectively;

FIG. 2 is an elementary diagram of a ball cage which is suitable for bearing-ball retention in FIG. 1;

FIG. 6 is a plan view of a preferred embodiment of a mounted scale of the invention;

FIGS. 7 and 7a are transverse sections to show a representative mounting plane for the scale of FIG. 6, the section being taken at VII—VII in FIG. 6, and FIGS. 7a and 7a being for different embodiments;

Figure 4:
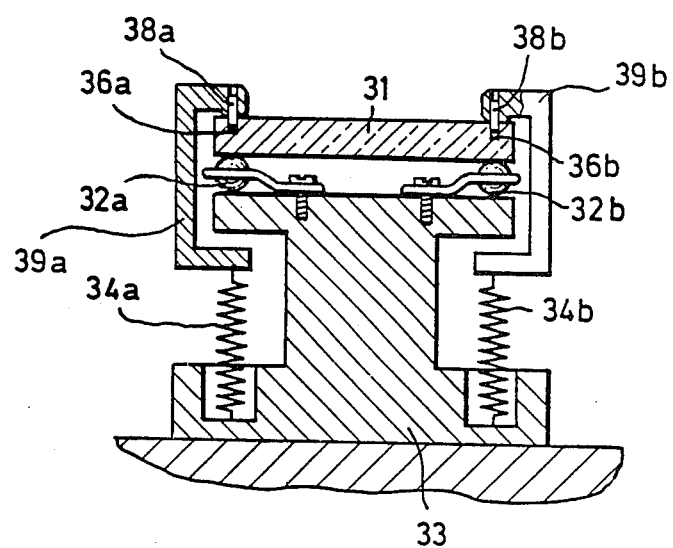
FIG. 4 is a transverse-sectional view of means for applying forces to a scale of the invention, in the direction normal to the scale.

In FIGS. 1a to 1c, a mounted scale 1 is characterized on its upper surface by an incremental graduation 8, consisting of a grid of transverse lines having a longitudinal-axis period of 16 $\mu$m. The graduation 8 is the scale proper, which will be understood to be scanned by a photoelectric sensor system (not shown), which measures position in the lengthwise direction of the scale 1. Alongside graduation 8, the upper surface of scale 1 is further characterized by a correction track 9 in the form of a plurality of spaced parallel lines extending in the lengthwise direction of the scale. The correction track 9 is an alignment-linearity measuring device and is scanned by a second sensor system (also not shown).

The scale 1 is mounted for rollable support with respect to a stationary holder member 3, via four bearing balls (2a to 2d); and to assure secure attachment independent of the installed position of scale 1, four springs (4a to 4d) are provided for resiliently loading scale 1 against the balls (2a to 2d). The force vector for each of the springs (4a to 4d) is arranged to be perpendicular to the characterized surface of the scale and to pass through a different one of the respective points of support, so that spring loading gives rise to no transverse forces on scale 1.

Bearing balls are also used to reference one lateral side of scale 1 against the adjacent lateral surface of the stationary holder. However, of the two balls 5 and 6 shown at longitudinally spaced locations in FIG. 1b, only one ball 6 is rollable between the scale and its holder; the second ball 5 is trapped by and between opposing V-notches in the side of the scale and of the holder. At this ball-5 location, scale 1 is longitudinally fixed in relation to its holder; however, in the event of a difference in thermal expansion of materials of the scale and its holder, the scale is free to roll on ball 6, as well as on the balls (2b to 2d) of its orthogonally related mounting. In similar fashion, the force vector for each of the springs 7a and 7b for loading the scale against balls 5 and 6 is arranged normal to the longitudinal axis and through a different one of the points 5 and 6 of lateral support.

In order to locate the points of ball support of the scale, and at the same time to assure that, except for ball 5, the balls have complete freedom to roll, these balls (designated 12 in FIG. 2) are resiliently positioned in a ball cage. In the simplest case, this ball cage consists of a recess 15 in a holder part 13, and recess 15 is large enough that the balls can execute the expected motions. A softly yieldable centering of each such ball is accomplished by means of four springs (14a to 14d).

Figure 3:
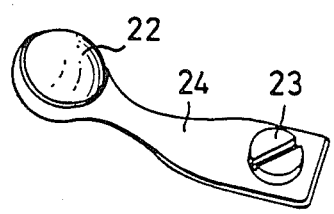
FIG. 3 is a perspective view of an alternative for the ball-cage retainer of FIG. 2.

The showings of FIGS. 1a to 1c and FIG. 2 will be understood to be schematic, simplified representations, which were selected to make clear the basic principle of measurement-scale mounting in accordance with the invention. It is clear that in a practical embodiment, other conditions must be taken into account which result in a somewhat different design. Thus, for example, it is possible, as shown in FIG. 3, to use a rubber strap 24 in place of a ball cage for resilient mounting of each ball 22, said strap being cut or stamped from elastically yieldable material and locally fastened to a part of the holder by a screw 23.

Figure 5:
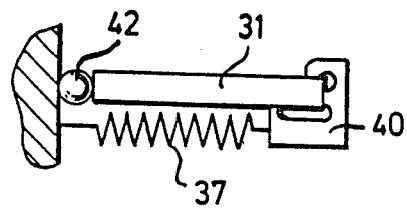
FIG. 5 is a transverse-sectional view of a means for clamping the scale of FIG. 4, in the direction of lateral support of the scale.

It is also possible to use tension springs to resiliently load the scale on its points of ball support; in FIG. 4, tension springs 34a/34b preload scale 31 on bottom-support balls 32a/32b, and in FIG. 5, a tension spring 37 laterally preloads scale 31 to its side-positioning ball 42. For the bottom-support purpose of FIG. 4, pedestals 33 provide an upwardly offset elevation for supporting scale 31 via balls 32a and 32b. The upper surface of the scale has drilled holes 36a and 36b in vertical alignment over the points of ball support, and contact pins (38a and 38b) of two clamp arms (39a and 39b) extend over left and right side edges of the scale and engage in these holes 36; in turn, the clamp arms are downwardly urged by the tension springs (34a and 34b), which connect the lower end of each arm to the base of pedestal 33, again in vector alignment normal to scale 31 and through the respective points 32a/32b of ball support.

With this type of clamping, the scanning of the measurement graduation on the upper surface of scale 31 is not impeded; and there is the further assurance that the point of spring (34) force application cannot shift. To support scale 31, there must be at least two support pedestals 33 of the variety illustrated in FIG. 4.

FIG. 5 illustrates use of a tension spring 37 at each location of side-referencing the scale 31 via a ball 42. In this arrangement, a clamp 40 engages marginally over the upper surface of scale 31 and assures against any shift of the point of application of the force exerted by spring 37.

FIGS. 6 and 7 show detail of the presently preferred embodiment for achieving a mechanically decoupled mounting of measuring scale 101, on the machine bed of a multi-coordinate measuring machine. This embodiment is particularly advantageous from the standpoint of least possible technical expenditure, and simple assembly. As in FIG. 1b, the scale 101 is characterized, alongside the scale graduations 108 for longitudinal measurement, by a correction track 109 for use in correcting for measured departures from linearity.

The scale 101 is pressed against bearing balls 102a and 102b at five longitudinally spaced locations, marked $L_1$ to $L_5$ in FIG. 6, and by paired laterally opposite leaf springs 104a and 104b. The bearing balls ride directly on the granite table 103 of the coordinate-measuring machine and are held in position by resilient felt rings 113a and 113b. These felt rings assume the role of the ball cage shown diagrammatically in FIG. 2, i.e., balls 102 are rollably retained by the felt rings, from all directions.

The pressing force of leaf springs (104a and 104b) against scale 101 is transmitted indirectly via balls (122a and 122b) between the leaf springs (104) and the upper surface of scale 101. The balls 122 are also retained in ball cages in the form of felt rings 123a and 123b. In the event of differences in length or changes in shape between scale 101 and the granite slab 103, the scale 101 can therefore roll freely between balls (102 and 122), and scale 101 will always return, without constraint, to its position of rest, since it need overcome only rolling friction.

As already described, the bottom surface of scale 101 is supported at five bearing locations ($L_1$ to $L_5$) in order to prevent sagging deformation due its own weight. The lateral reference for one side of scale 101 is via two balls 105 and 106. The ball 105 rests in a V-shaped groove in a longitudinally extending ledge (116a) part of the scale holder, extending parallel to the scale. Scale 101 locates against ball 105 via a positioning element 111 which is bonded to the scale and is likewise provided with a V-shaped groove. Pressing force is applied to the scale from the opposite side by a spring-loaded ball 117a; the loading spring (107a) for ball 117a is captive in a bore in another longitudinally extending ledge (116b). At this location ($L_1$), the scale is thus fixed in position with respect to its holder.

At the other end of scale 101, a second spring 107b, acting via a ball 117b, presses the scale against a lateral stop formed by a ball 106. As with the other balls (107a and 107b), ball 106 is also rollably retained in a felt ring and contacts the polished end of an insertion pin 126 which is adjustable in depth, and on which ball 106 can roll in nearly frictionless manner.

Figure 8:
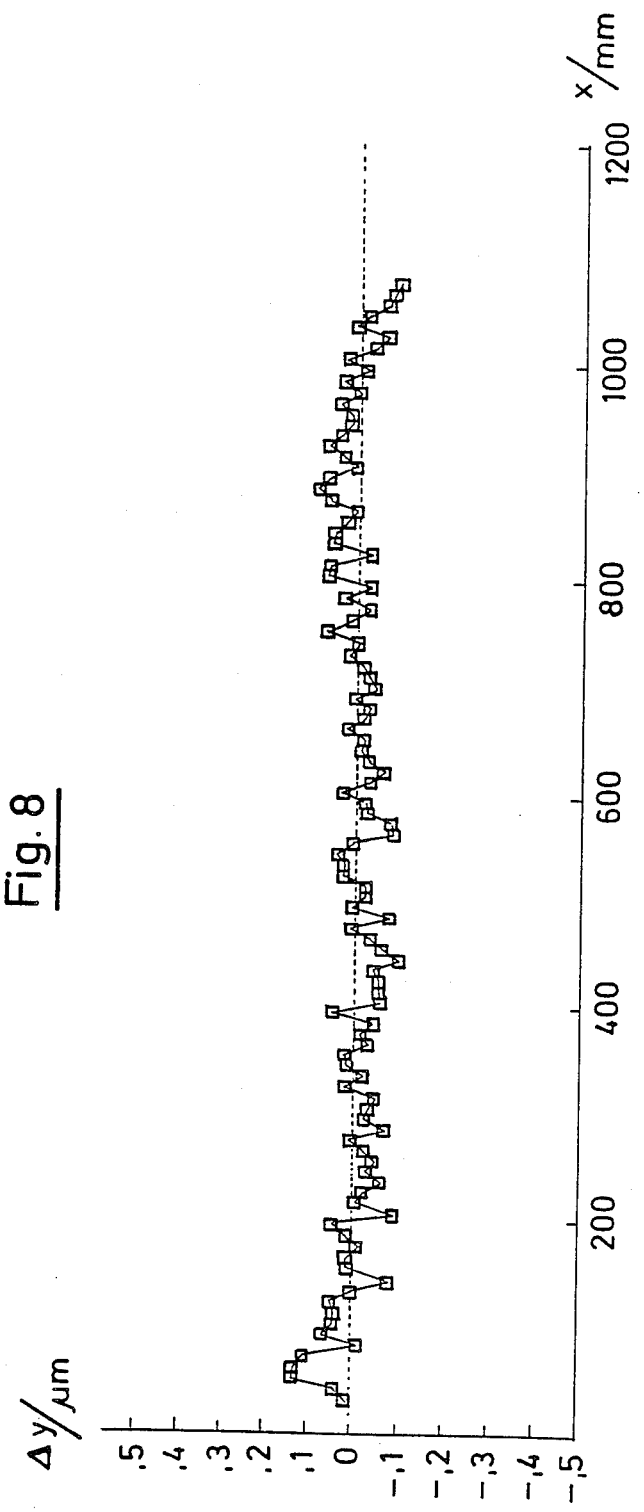
FIG. 8 is a graph to show relative change in the linearity measurement values of the mounted scale of FIGS. 6 and 7.

In the mount of FIGS. 6 and 7, scale 101 is retained in a manner that is very stable for a long time and is reproducible. Measurements have shown that linearity-measurement values supplied by the correction track 109 differ by less than 0.2 $\mu$m from one another, even after several weeks and with thermal loading of the scale in the interim; the measurement diagram to support this statement is given in FIG. 8, wherein $\Delta y$ indicates the relative change in the linearity measurement values of two measurements effected four weeks apart and is plotted against the length of scale x. The differences remain less than 0.2 $\mu$m.

Figure 9:
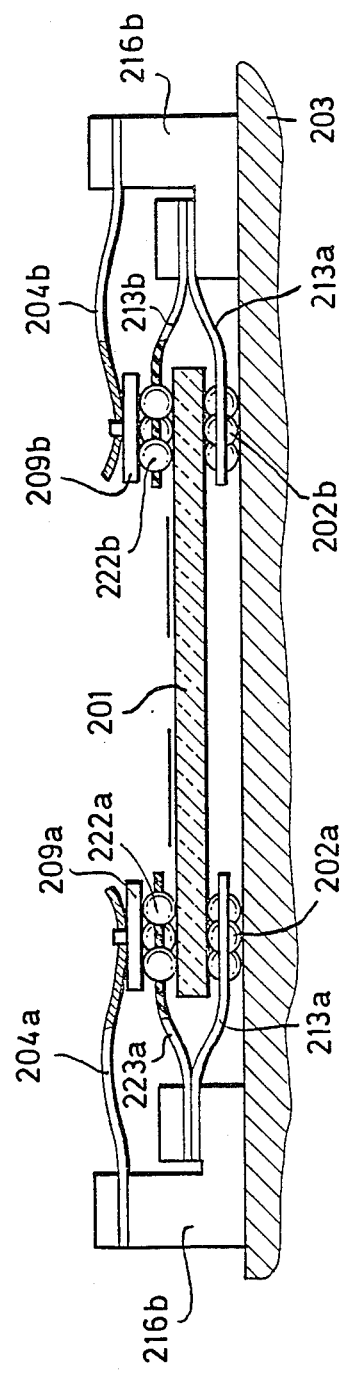
FIG. 9 is a transverse section, similar to FIG. 7 but on an enlarged scale, to show a modification.

In the scale mounting of FIGS. 6 and 7, the surfaces between which the balls (102 and 122) roll must be as flat and parallel to each other as possible, so that no constraining forces arise in the clamping plane. Furthermore, the felt rings (113 and 123) must provide assurance that the oppositely located pairs of balls (for example, 113a/123a) are not displaced in the direction of the scale. Fulfillment of these requirements can cause problems in applications that require especially high precision. It is then expedient, as shown in FIG. 9, to replace each of the single balls at the support points for scale 201 with a triangular cluster of three balls (202a and 202b), the balls of each cluster being retained in uniformly spaced array about a central axis of spring-force application and scale support, via a perforated rubber strap (213a and 213b, respectively); similarly, to apply the preloading force of each of the leaf springs (204a and 204b) to the two marginal sides of the scale, single-ball contact is replaced by a clustered group of three balls (222a and 222b), retained in a rubber strap (223a and 223b). Further, between each of the leaf springs (204a, b) and the corresponding group of three balls (222a, b), a flat pressure plate (209a and 209b, respectively) is provided for distributing to all three balls of the group the single spring force that is centrally applied to the pressure plate. Each of the pressure plates is preferably slightly spherically concave at its lower face, whereby a stable position of rest is created for the balls in the transverse direction, since spring force will thereby increase slightly for any ball displacement from the at-rest position.

The springs (204a, b) and the rubber straps (223a, b and 213a, b) are mutually secured to two longitudinally extending ledges (216a and 216b), along opposite lateral sides of scale 201 and ledges 216a/216b are in turn secured to the granite table 203 of a length-measuring machine.

The mounting in accordance with the invention is not only suitable for the attachment of scales of the type described, but can also be used in any measuring or machining situation where an accurate scale or straight-edge or other reference is desired.

Furthermore, the described principle of scale mounting lends itself to incorporation of the scale and its fully assembled mount, as a single unit-handling article of manufacture, thereby rendering the same applicable, e.g., as a retrofit to upgrade the inherent measuring capability of existing measuring machines having more primitive scan-readable scales. The simplified diagram of FIG. 4 illustrates one embodiment of such a unit-handling scale/mount assembly, and the section of FIG. 7a indicates such a unit-handling article of manufacture for the case of the preferred embodiment, namely, wherein a base or mounting plate 130 replaces the granite table 103 of FIG. 7 and provides (1) permanently spaced parallel assembly of the ledge rails 116a/116b, (2) laterally outer margins 131 for machine-mounting purposes as at spaced lateral mounting-bolt locations 132, and (3) plane-parallel upper and lower surfaces, so that balls 102a/102b can properly support scale 101 for the described rolling contact. The dashed outlines 133 suggest securing means, such as countersunk bolts (in planes offset from the section plane of FIG. 7a) for securing the ledge rails to base 130 in their described spaced-parallel relation.

What is claimed is:

1. In combination, an elongate measuring scale having flat upper and lower surfaces between lateral sides, said upper surface having measuring indicia thereon, a holder comprising a first support surface spaced from and parallel to said lower surface and a second support surface spaced from and parallel to one of said lateral sides, a set of balls in rolling contact with the lower surface of said scale and with said first support surface at a plurality of spaced locations, first biasing means preloading said scale against the balls of said set, at least one further ball in contact with said one lateral side and in rolling contact relation with said second supporting surface, second biasing means preloading said scale against said at least one further ball, and fixing means for preventing longitudinal displacement between said scale and said holder, said fixing means acting at a single point on said scale, said point being longitudinally spaced from said one ball, whereby allowance is made for thermal expansion between said scale and said holder.

2. As an article of manufacture, an elongate measuring scale having flat upper and lower surfaces between lateral sides, said upper surface having measuring indicia thereon, a holder comprising an elongate flat base spaced from and parallel to said flat base, said flat base having a lateral support parallel to one of said lateral sides; a set of balls in rolling contact with the lower surface of said scale and with said flat base at a plurality of spaced locations, first biasing means preloading said scale against the balls of said set, at least one further ball in contact with said one lateral side and in rolling contact with said lateral support surface, second biasing means preloading said scale against said at least one further ball, and fixing means for preventing longitudinal displacement between said scale and said holder, said fixing means acting at a single point on said scale, said point being longitudinally spaced from said one ball, whereby allowance is made for thermal expansion between said scale and said holder.

3. The combination of claim 1 or the article of claim 2, in which the balls of said first set are each rollably retained within a relatively small region.

4. The combination of claim 1 or the article of claim 2, in which the scale is a length-measuring device.

5. The combination of claim 1 or the article of claim 2, in which the scale is a length-measuring device and carries linearity-measuring indicia in the form of spaced parallel lines which extend longitudinally of the scale.

6. The combination of claim 1 or the article of claim 2, in which the scale is a length-measuring device and in which said set of balls comprises longitudinally spaced pairs of balls wherein the balls of each pair are laterally spaced.

7. The combination of claim 1 or the article of claim 2, in which said fixing means includes a ball establishing non-rolling contact at said single point, and in which third biasing means preloads said non-rolling contact.

8. The combination of claim 1 or the article of claim 2, in which said first biasing means comprises, for each of the balls of said set, a separate biasing device in individual preloading alignment with the center of the involved ball, and in which said individual preloading alignment is prependicular to the lower surface of said scale.

9. The combination of claim 1 or the article of claim 2, in which said fixing means includes a first ball establishing non-rolling contact at said single point, and in which third biasing means preloads said non-rolling contact via a rollably retained rolling-contact ball engagement to said scale.

10. The combination of claim 1 or the article of claim 2, in which the balls of said first set are each rollably retained by softly compliant restraint within a relatively small region.

11. The combination of claim 1 or the article of claim 2, in which said first biasing means comprises, for each of the balls of said set, a separate biasing device in individual preloading alignment with the center of the involved ball, and in which said individual preloading alignment is perpendicular to the lower surface of said scale, said separate biasing device in each case including a cantilevered leaf spring.

12. The combination of claim 1 or the article of claim 2, in which said elongate measuring scale is of a material selected from the group comprising a glass and a ceramic.

13. The combination of claim 1 or the article of claim 2, in which said elongate measuring scale is a straightedge device.

14. In combination, an elongate measuring scale having flat upper and lower surfaces between spaced lateral sides, said upper surface having measuring indicia thereon, a holder comprising laterally spaced parallel elongate ledge rails spaced from the lateral sides of said scale, a flat upwardly facing support surface beneath said scale and between said ledge rails; first paired sets of supporting balls in laterally spaced relation and in rolling-contact relation with said supporting surface and with the lower surface of said scale at each of a plurality of longitudinally spaced locations, resilient means preloading the rolling contact relation of said scale and said supporting surface, said last-defined means comprising means applying a separate preloading force vector normal to the upper surface of said scale and directionally aligned with each supporting ball; and lateral-stabilizing means for scale positioning between said ledge rails, said stabilizing means comprising a rolling-contact ball and a non-rolling contact ball in lateral contact with one ledge rail and with the adjacent lateral side of said scale, said rolling contact ball and said non-rolling contact ball being at longitudinally spaced locations, first spring means reacting between the other ledge rail and the adjacent other lateral side of said scale at one of said last-mentioned longitudinal locations, and second spring means reacting between said other ledge rail and said adjacent other lateral side of said scale at the other of said last-mentioned longitudinal locations, each of said spring means applying a separate lateral preloading force vector normal to the adjacent lateral side of said scale and directionally aligned with a different one of said non-rolling-contact and rolling-contact balls.

15. In combination, an elongate measuring scale having flat upper and lower surfaces between spaced lateral sides, said upper surface having measuring indicia thereon, a holder comprising laterally spaced parallel elongate ledge rails spaced from the lateral sides of said scale, a flat upwardly facing support surface beneath said scale and between said ledge rails; first and second sets of supporting balls in longitudinally spaced relation with the lower surface of said scale near the respective lateral sides of said scale, resilient means preloading the rolling contact relation of said scale and said supporting surface, said last-defined means comprising means applying a separate preloading force vector normal to the upper surface of said scale and directionally aligned with each supporting ball; and lateral-stabilizing means for scale positioning between said ledge rails, said stabilizing means comprising a rolling-contact ball and a non-rolling contact ball in lateral contact with one ledge rail and with the adjacent lateral side of said scale, said rolling-contact ball and said non-rolling contact ball being at longitudinally spaced locations, first spring means reacting between the other ledge rail and the adjacent other lateral side of said scale at one of said last-mentioned longitudinal locations, and second spring means reacting between said other ledge rail and said adjacent other lateral side of said scale at the other of said last-mentioned longitudinal locations, each of said spring means applying a separate lateral preloading force vector normal to the adjacent lateral side of said scale and directionally aligned with a different one of said non-rolling-contact and rolling-contact balls.

16. As an article of manufacture, an elongate measuring scale having flat upper and lower surfaces between spaced lateral sides, said upper surface having measuring indicia thereon, a holder comprising an elongate flat base and laterally spaced parallel elongate ledge rails secured to said base and spaced from the lateral sides of said scale, said base providing a flat upwardly facing support surface beneath said scale and between said ledge rails; first sets of supporting balls in laterally and longitudinally spaced relation with the lower surface of said scale, resilient means preloading the rolling contact relation of said scale and said supporting surface, said last-defined means comprising applying a separate preloading force vector normal to the upper surface of said scale and directionally aligned with each supporting ball; and lateral-stabilizing means for scale positioning between said ledge rails, said stabilizing means comprising a rolling-contact ball and a non-rolling contact ball in lateral contact with one ledge rail and with the adjacent lateral side of said scale, said rolling-contact ball and said non-rolling contact ball being at longitudinally spaced locations, first spring means reacting between the other ledge rail and the adjacent other lateral side of said scale at one of said last-mentioned longitudinal locations, and second spring means reacting between said other ledge rail and said adjacent other lateral side of said scale at the other of said last-mentioned longitudinal locations, each of said spring means applying a separate lateral preloading force vector normal to the adjacent lateral side of said scale and directionally aligned with a different one of said non-rolling-contact and rolling-contact balls.

17. As an article of manufacture, an elongate measuring scale having flat upper and lower surfaces between spaced lateral sides, said upper surface having measuring indicia thereon, a holder comprising parallel elongate ledge rails in laterally fixed spaced relation and spaced from the lateral sides of said scale, and a flat upwardly facing support surface beneath said scale and between said ledge rails, said support surface being a fixed part of said holder; first sets of supporting balls in laterally and longitudinally spaced relation with the lower surface of said scale, resilient means preloading the rolling contact relation of said scale and said supporting surface, said last-defined means comprising means applying a separate preloading force vector normal to the upper surface of said scale and directionally aligned with each supporting ball; and lateral-stabilizing means for scale-positioning between said ledge rails, said stabilizing means comprising a rolling-contact ball and a non-rolling contact ball in lateral contact with one ledge rail and with the adjacent lateral side of said scale, said rolling-contact ball and said non-rolling contact ball being at longitudinally spaced locations, first spring means reacting between the other ledge rail and the adjacent other lateral side of said scale at one of said last-mentioned longitudinal locations, and second spring means reacting between said other ledge rail and said adjacent other lateral side of said scale at the other of said last-mentioned longitudinal locations, each of said spring means applying a separate lateral preloading force vector normal to the adjacent lateral side of said scale and directionally aligned with a different one of said non-rolling-contact and rolling-contact balls.

* * * * *